US010367956B2

(12) United States Patent
Yamada

(10) Patent No.: US 10,367,956 B2
(45) Date of Patent: Jul. 30, 2019

(54) MAINTENANCE SUPPORT DEVICE, IMAGE FORMING APPARATUS, MAINTENANCE SUPPORT METHOD, AND NON-TRANSITORY RECORDING MEDIUM FOR STORING COMPUTER READABLE PROGRAM

(71) Applicant: KONICA MINOLTA, INC., Chiyoda-ku, Tokyo (JP)

(72) Inventor: Masami Yamada, Osaka (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/601,484

(22) Filed: May 22, 2017

(65) Prior Publication Data

US 2017/0346962 A1 Nov. 30, 2017

(30) Foreign Application Priority Data

May 24, 2016 (JP) .................................. 2016-103287

(51) Int. Cl.
| | |
|---|---|
| *H04N 1/00* | (2006.01) |
| *G06F 3/12* | (2006.01) |
| *H04N 1/32* | (2006.01) |
| *G06F 11/07* | (2006.01) |

(52) U.S. Cl.
CPC ....... *H04N 1/00344* (2013.01); *G06F 3/1231* (2013.01); *G06F 3/1232* (2013.01); *G06F 11/07* (2013.01); *H04N 1/00236* (2013.01); *H04N 1/32122* (2013.01)

(58) Field of Classification Search
CPC combination set(s) only.
See application file for complete search history.

(56) References Cited

U.S. PATENT DOCUMENTS

| | | | | |
|---|---|---|---|---|
| 2010/0115150 | A1* | 5/2010 | Hachiya | G06F 1/266 710/19 |
| 2014/0070758 | A1* | 3/2014 | Zhou | H01M 10/44 320/103 |
| 2015/0103375 | A1* | 4/2015 | Mihira | G06F 3/1288 358/1.15 |
| 2015/0109637 | A1* | 4/2015 | Ikeda | H04N 1/0049 358/1.15 |

(Continued)

FOREIGN PATENT DOCUMENTS

| | | |
|---|---|---|
| JP | 2002-094545 A | 3/2002 |
| JP | 2006-094021 A | 4/2006 |

(Continued)

*Primary Examiner* — Helen Zong
(74) *Attorney, Agent, or Firm* — Buchanan Ingersoll & Rooney PC

(57) ABSTRACT

A maintenance support device for supporting maintenance of an apparatus includes a communication interface configured to perform communication with the apparatus through a communication cable and to feed electric power to the apparatus; and an information obtaining portion configured to obtain from the apparatus, while the apparatus is fed with the electric power, pre-replacement individual identification information and post-replacement individual identification information for a target component for replacement work on the apparatus by communication using the communication interface.

14 Claims, 12 Drawing Sheets

(56) References Cited

U.S. PATENT DOCUMENTS

| | | | |
|---|---|---|---|
| 2016/0037003 A1* | 2/2016 | Oku | H04N 1/00344 358/406 |
| 2016/0055996 A1* | 2/2016 | Quezada | H02G 3/14 200/51 R |
| 2016/0156799 A1* | 6/2016 | Ninomiya | H04N 1/00896 358/1.13 |

FOREIGN PATENT DOCUMENTS

| | | |
|---|---|---|
| JP | 2007-026083 A | 2/2007 |
| JP | 2009-237985 A | 10/2009 |
| JP | 2010-034715 A | 2/2010 |
| JP | 2010-108423 A | 5/2010 |
| JP | 2011-040092 A | 2/2011 |
| JP | 2015-226389 A | 12/2015 |

* cited by examiner

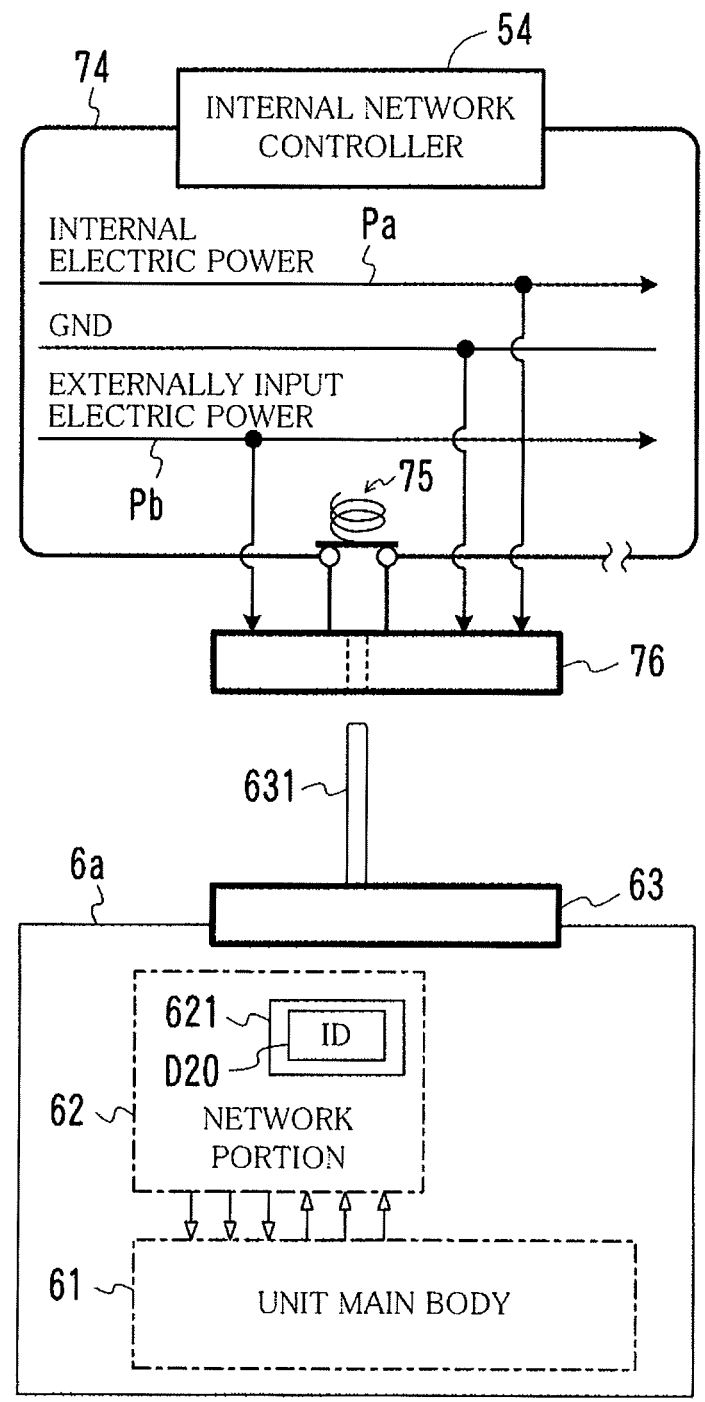

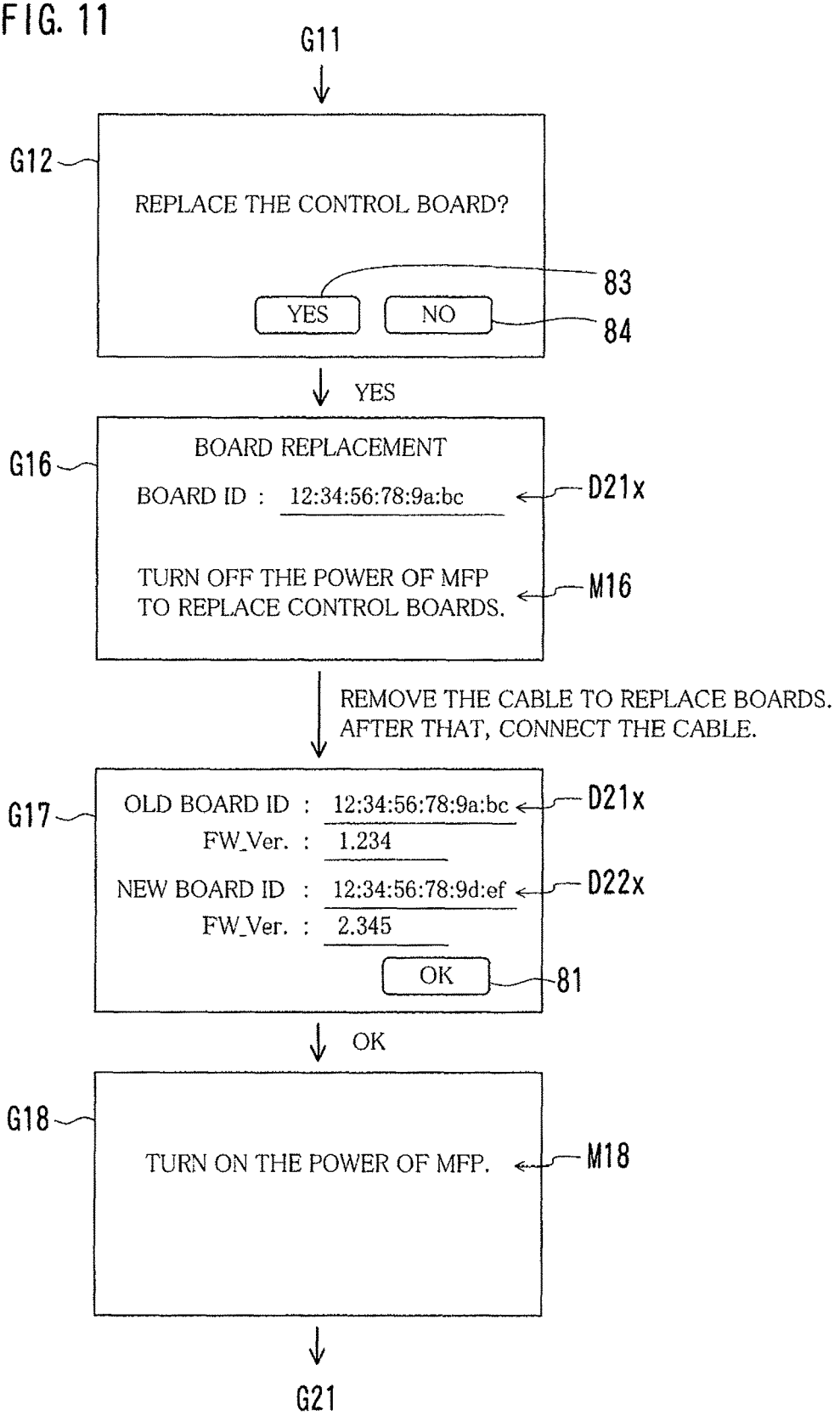

MAINTENANCE SUPPORT DEVICE, IMAGE FORMING APPARATUS, MAINTENANCE SUPPORT METHOD, AND NON-TRANSITORY RECORDING MEDIUM FOR STORING COMPUTER READABLE PROGRAM

The present U.S. patent application claims a priority under the Paris Convention of Japanese patent application No. 2016-103287 filed on May 24, 2016, the entirety of which is incorporated herein by reference.

BACKGROUND OF THE INVENTION

1. Field of the Invention

The present invention relates to a maintenance support device, an image forming apparatus, a maintenance support method, and a non-transitory recording medium for storing a computer readable program.

2. Description of the Related Art

In image forming apparatuses such as a printer, copier, and a multi-functional peripheral (MFP: multifunction device or combination machine), a section including a member or mechanism that has a tendency to easily deteriorate is constructed in the form of a detachable unit for ease of maintenance. This allows a service person to replace units so that the performance of an image forming apparatus is kept good or a failure is fixed.

Such an image forming apparatus is often connected to a host device, e.g., a personal computer, to enable communication therewith. In such a case, the image forming apparatus prints an image, informs the host device of status information, or the like in response to a request from the host device.

A means for connecting the image forming apparatus and the host device together is, for example, a Universal Serial Bus (USB). Where the USB is used as the connecting means, the image forming apparatus usually communicates as a USB device with the host device. When being connected via a USE communication cable, the image forming apparatus can be supplied with prescribed DC power from the host device functioning as a USB host.

The conventional technologies below have been proposed for using, in a USB device, electric power supplied from a USB host.

According to one of the technologies, where electric power supplied from a USB host is sufficient, an internal power source is turned OFF to reduce the power consumption in a USB device (Japanese Laid-open Patent Publication No. 2009-237985).

According to another one of the technologies, of a power source of a USB host and a power source of a USB device, a more efficient power source is selected and used. Thereby, the power consumption of a whole system including the USB host and the USB device is reduced (Japanese Laid-open Patent Publication No. 2007-026083).

According to another one of the technologies, a USB hub device is disclosed which has a built-in battery and can be switched between a self-powered mode and a bus-powered mode. The USB hub device uses a bus power, for example, when the amount of battery remaining is small (Japanese Laid-open Patent Publication No. 2002-094545).

According to some of the technologies, an information processing device keeps supplying bus power even after making transition to a non-operational state such as suspend, as long as a party to which the information processing device is connected via a USB needs to be supplied with bus power (Japanese Laid-open Patent Publication Nos. 2015-226389 and 2011-040092).

According to yet another one of the technologies, an information processing device informs a user that electric power is supplied to an external electronic device also in a power-saving mode (Japanese Laid-open Patent Publication No. 2010-108423).

A service person who provides maintenance of a device operated by commercial power, such as an image forming apparatus, conducts work for unit replacement in a state where a power switch of the device is turned OFF. After the replacement work, the service person turns ON the power switch to operate the device, confirms that the device operates normally, and then finishes the maintenance work.

In the conventional cases, the service person writes, by hand, a record of the details of maintenance work on paper, or manually inputs the record into a mobile terminal (tablet PC or smartphone, for example) carried by him/her. In such a case, the service person writes or inputs a wrong identification number of the unit replaced, or writes or inputs a rough time needed for the replacement. This causes a problem that the record is possibly inaccurate.

The conventional technologies above do not solve the problem concerning a maintenance work record.

SUMMARY

The present invention has been achieved in light of such a problem, and therefore, an object of an embodiment of the present invention is to record the details of maintenance work with no commercial power supplied, more accurately than is conventionally possible.

To achieve at least one of the objects mentioned above, according to an aspect, a maintenance support device for supporting maintenance of an apparatus includes a communication interface configured to perform communication with the apparatus through a communication cable and to feed electric power to the apparatus; and an information obtaining portion configured to obtain from the apparatus, while the apparatus is fed with the electric power, pre-replacement individual identification information and post-replacement individual identification information for a target component for replacement work on the apparatus by communication using the communication interface.

Preferably, the maintenance support device includes a record processing portion configured to send record data to an external management device. The record data indicates the pre-replacement individual identification information obtained and the post-replacement individual identification information obtained.

BRIEF DESCRIPTION OF THE DRAWINGS

The above and other objects, advantages, and features of the present invention will become more fully understood from the detailed description given hereinbelow and the appended drawings which are given by way of illustration only, and thus are not intended as a definition of the limits of the present invention, and wherein:

FIGS. 4A and 4B are diagrams showing an example of the configuration of a connection part between a unit of an image forming apparatus and a main body;

FIG. 11 is a transition diagram of a guide screen for maintenance work.

DESCRIPTION OF THE PREFERRED EMBODIMENTS

Hereinafter, an embodiment of the present will be described with reference to the drawings. However, the scope of the invention is not limited to the illustrated examples.

Figure 1:
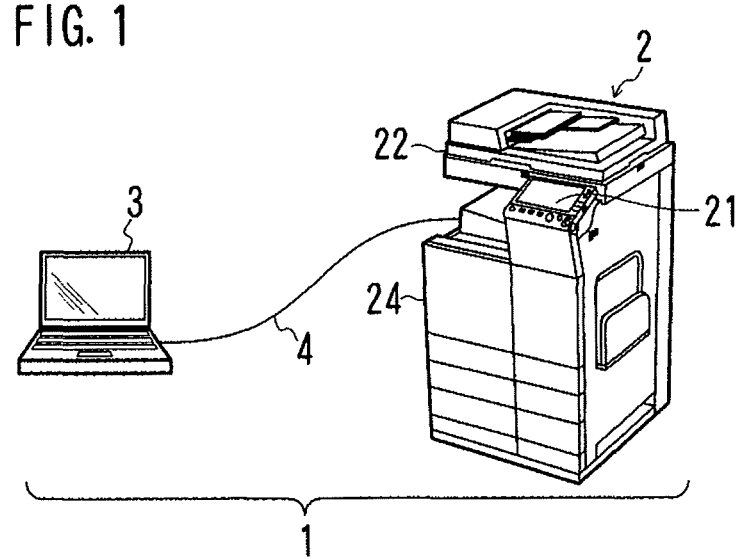
FIG. 1 is a diagram showing an example of the configuration of a maintenance support system including a maintenance support device according to an embodiment of the present invention.

FIG. 1 shows an example of the configuration of a maintenance support system 1 including a maintenance support device 3 according to an embodiment of the present invention. The maintenance support system 1 includes an image forming apparatus 2 and the maintenance support device 3.

The image forming apparatus 2 is an example of a device which is to be subjected to maintenance. The image forming apparatus 2 is, for example, a Multi-functional Peripheral (MFP) into which functions of, for example, a copier, a printer, and a facsimile machine are incorporated.

The maintenance support device 3 is to support maintenance of the image forming apparatus 2. The maintenance support device 3 is used by, for example, a service person. The maintenance support device 3 may be any kind of device as long as it can perform communication with the image forming apparatus 2 via a communication cable 4 and can execute a support application 300 described later. The maintenance support device 3 may be a portable information processing device such as a laptop (notebook) personal computer, a tablet PC, or a smartphone.

The image forming apparatus 2 and the maintenance support device 3 are configured to connect to each other to perform communication with each other via the communication cable 4. The communication cable 4 is a USB cable, for example. The USB cable contains a signal line for sending/receiving data and a supply line (VBUS) for supplying a predetermined type of electric power from a USB host to a USB device. For maintenance work of the image forming apparatus 2, the maintenance support device 3 is connected via the communication cable 4 to the image forming apparatus 2.

Figure 2:
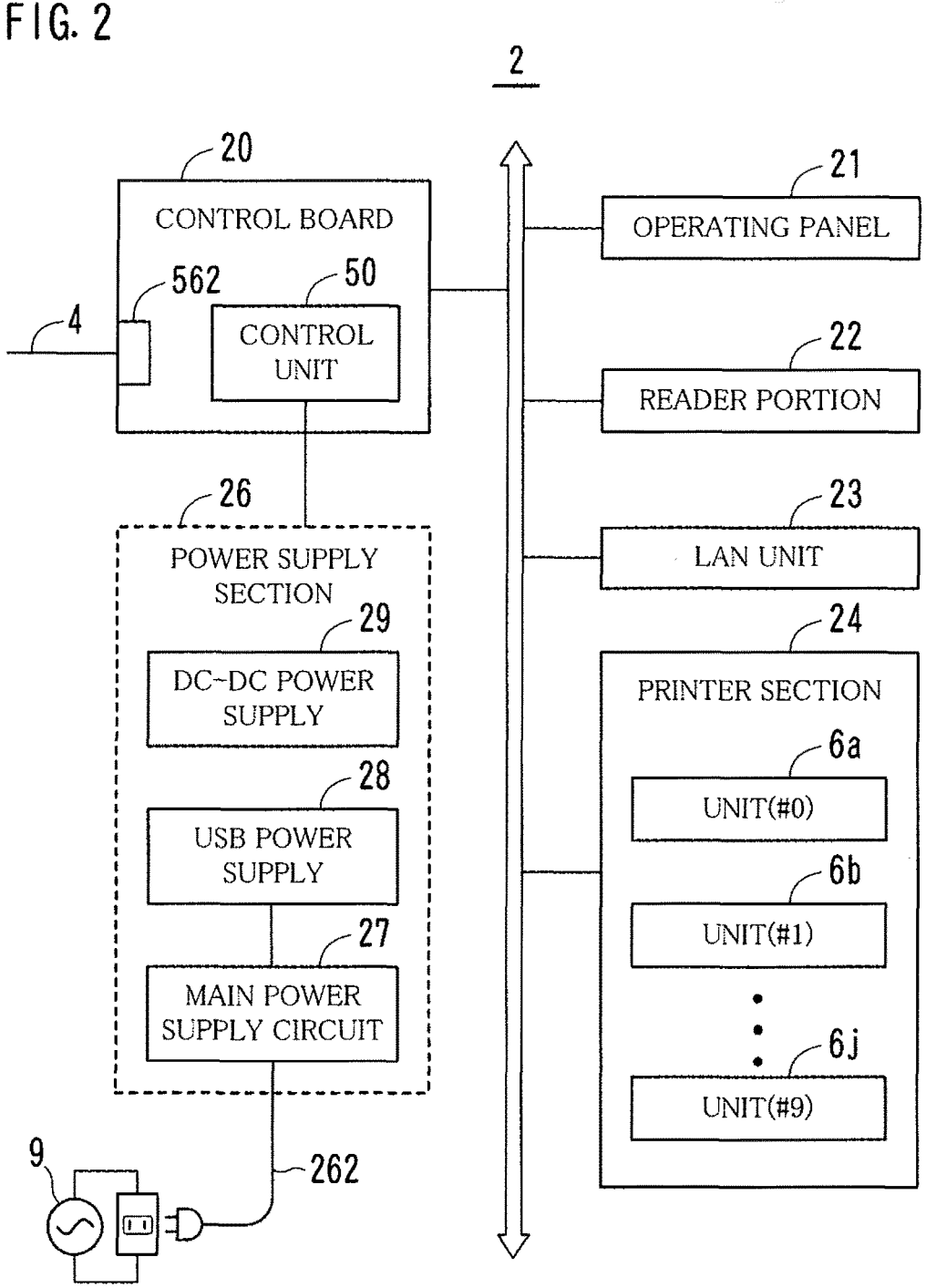
FIG. 2 is a diagram showing an example of the outline of the hardware configuration of an image forming apparatus.

FIG. 2 shows an example of the outline of the hardware configuration of the image forming apparatus 2. The image forming apparatus 2 is provided with an operating panel 21, a reader portion 22, a LAN unit 23, a printer section 24, a control board 20, a power supply section 26, and so on.

The operating panel 21 includes a touch panel display and a hard key panel. The operating panel 21 sends a signal in accordance with user's input to the control board 20.

The reader portion 22 includes an automatic document feeder and a flat-bed scanner. The reader portion 22 optically reads an image shown on a document sheet placed on a document tray of the automatic document feeder or on a platen glass of the scanner.

The LAN unit 23 is a network interface for communicating with an external device via a Local Area Network (LAN).

The printer section 24 is operable to form an image onto paper by electrophotographic steps on the basis of data on an image captured by the reader portion 22 or of data on a document inputted through communication by the LAN unit 23. The printer section 24 is capable of forming a color image.

The printer section 24 uses a plurality of units 6a, 6b, 6c, 6d, 6e, 6f, 6g, 6h, 6i, and 6j (FIG. 3) to form an image. The units 6a through 6j are, for example, a developing unit, a fixing unit, and an exposure unit. The developing unit and the exposure unit are provided for each of four colors of cyan (C), magenta (M), yellow (Y), and black (K). One or more of the units 6a through 6j may be an imaging unit in which a photoconductor and a peripheral device such as developing equipment disposed around the photoconductor are integral with each other. The units 6a through 6j are so provided to be easily detachable. The units 6a through 6j are replaced with new units, as needed, while the image forming apparatus 2 is subjected to maintenance.

The control board 20 is an electric circuit board having a control unit 50 that controls an overall operation of the image forming apparatus 2. The control board 20 has mounted thereon a connector portion 562 to which the communication cable 4 is connected.

The power supply section 26 includes a main power supply circuit 27, a USB power supply 28, and a DC-DC power supply 29. The power supply section 26 is connected via a power supply cord 262 to a commercial power supply 9.

The main power supply circuit 27 converts commercial power supplied from the commercial power supply 9 into DC or AC power having a predetermined voltage suitable to each of internal supply destinations of the image forming apparatus 2, and supplies the resultant to the internal supply destinations.

The supply destinations of the electric power from the main power supply circuit 27 are almost all the elements operated by electric power in the image forming apparatus 2. Stated differently, operation of the entirety of the image forming apparatus 2 definitely needs electric power supply from the main power supply circuit 27.

The main power supply circuit 27 stops supplying electric power when the commercial power input is stopped, for example, when a power switch (not shown) is turned OFF, the power supply cord 262 is removed from the commercial power supply 9, or the commercial power supply 9 fails.

When the image forming apparatus 2 is connected through the communication cable 4 to another device and operates as a USB host, the USB power supply 28 supplies DC power having, for example, 5 volts to a device of the other end of the connection (USB device). The USB power supply 28 is supplied, by the main power supply circuit 27, with electric power necessary for power feed to the other end of the connection.

When the image forming apparatus 2 is connected through the communication cable 4 to another device and operates as a USB device, the DC-DC power supply 29 steps down DC power supplied from a device of the other end of the connection (USB host) and outputs the resultant.

In the following description, electric power produced within the image forming apparatus 2 by the main power supply circuit 27 based on the commercial power is sometimes referred to as "internal electric power". Further, DC power externally supplied via the communication cable 4 and electric power obtained by transforming the DC power are collectively referred to as "externally input electric power" in some cases.

Figure 3:
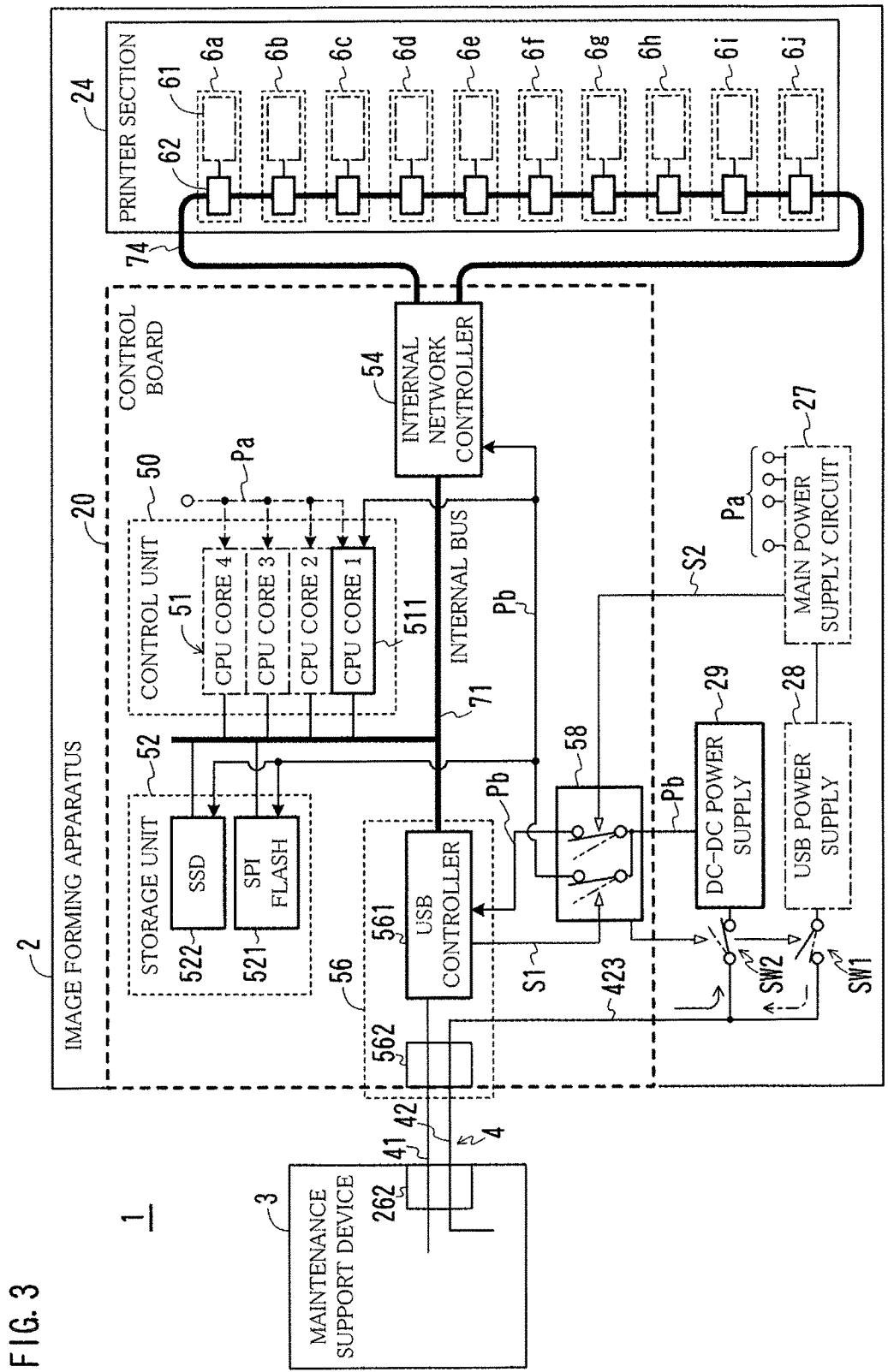
FIG. 3 is a diagram showing an example of the main part of an image forming apparatus.

FIG. 3 shows an example of the main part of the image forming apparatus 2. In FIG. 3, an element that does not operate while the supply of internal electric power Pa stops is shown by a dot-dash line.

In the image forming apparatus 2, the control board 20 includes a control unit 50, a storage unit 52, an internal network controller 54, a USB communication interface 56, and a power supply switching circuit 58.

The control unit 50 is configured of a Central Processing Unit (CPU) 51, and so on. The CPU 51 reads a predetermined control program out of the storage unit 52 to execute the control program; thereby controls the image forming apparatus 2. The control unit 50 uses an internal bus 71 to receive/send data with the storage unit 52, the internal network controller 54, and the USB communication interface 56, if necessary.

The CPU 51 has, for example, four CPU cores which can operate in parallel with one another. The four CPU cores are supplied with the internal electric power Pa. Any one of the CPU cores (CPU core 511, for example) is supplied, by the DC-DC power supply 29, with externally input electric power Pb via the power supply switching circuit 58. Stated differently, wiring for feeding electric power to the CPU 51 is so structured that the CPU core 511 can operate even if the supply of the internal electric power Pa stops.

When the supply of the internal electric power Pa stops, the control unit 50 having the CPU core 511 operates by the externally input electric power Pb from an external device connected via the communication cable 4, and responds to a command from the external device. When being instructed to send information on the image forming apparatus 2, the control unit 50 follows the instruction to inform the external device of, for example, individual identification information on the attached units 6a through 6j via the communication interface 56.

The storage unit 52 includes a flash memory 521 and a Solid State Drive (SSD) 522. The flash memory 521 sends and receives data with the CPU 51 and so on via a Serial Peripheral Interface (SPI). The SSD 522 is used to store the volume of data greater than the storage capacity of the flash memory 521.

The internal network controller 54 uses a signal line 74 to detect attachment/detachment of the units 6a through 6j of the printer section 24, then to inform the CPU 51 of the result of detection. The internal network controller 54 also serves to inform the units 6a through 6j of a command from the CPU 51, and to convey responses from the units 6a through 6j to the CPU 51.

The signal line 74 is so disposed to extend from the internal network controller 54 beyond the control board 20 to pass through the printer section 24 to reach again the internal network controller 54. Each of the units 6a through 6j includes a unit main body 61 having a drive mechanism for image formation and a network portion 62 communicating with the internal network controller 54. In a state where the units 6a through 6j are connected to the image forming apparatus 2, the network portions 62 thereof are connected to the signal line 74.

The USB communication interface 56 includes a USB controller 561 and a connector portion 562. In this embodiment, the connector portion 562 conforms to the standard of Type-C for USB 3.0 or USB 3.1. Stated differently, the connector portion 562 is connected with a Type-C cable as the communication cable 4. The use of the Type-C communication cable 4 allows switching between the feed from an external device and the feed to the external device through a supply line 42 of the communication cable 4 without changing or connecting again the communication cable 4, which is different from the case where a Type-B cable is used. In the following example, it is supposed that, as the external device, the maintenance support device 3 is connected to the image forming apparatus 2.

The USB controller 561 performs communication with the maintenance support device 3 via a signal line 41 of the communication cable 4. When receiving packets from the maintenance support device 3, the USB controller 561 extracts data from the packets to convey the data to the CPU 51. Also, when receiving an input of data from the CPU 51, the USB controller 561 puts the data into packets to send the resultant.

When the main power supply circuit 27 stops supplying the internal electric power Pa, the power supply switching circuit 58 supplies only a part of the image forming apparatus 2 with the externally input electric power Pb fed by the DC-DC power supply 29. At this time, the DC-DC power supply 29 is supplied with electric power from the maintenance support device 3 through the supply line 42 and an internal supply line 423.

The supply destinations of the externally input electric power Pb from the power supply switching circuit 58 are the control unit 50, the storage unit 52, the internal network controller 54, the USE communication interface 56, and each of the network portions 62 of the units 6a through 6j.

However, concerning the control unit 50, the supply destination is not the entirety thereof but only a part thereof involving in responding to a command from the maintenance support device 3. For example, concerning the CPU 51, the externally input electric power Pb is supplied only to the CPU core 511 of the four CPU cores as described above. Narrowing down the supply destinations leads to power-saving.

Prior to the supply of the externally input electric power Pb to the control unit 50, the power supply switching circuit 58 supplies the externally input electric power Pb to the communication interface 56. This is to enable minimization of consumption of the externally input electric power Pb and an inquiry to the maintenance support device 3 about the feed capability thereof.

The power supply switching circuit 58 receives an input of a control signal S1 from the communication interface 56. The control signal S1 is inputted where the maintenance support device 3 has such a feed capability as to feed electric power to the control unit 50, in other words, where a feed capability which the communication interface 56 has made the inquiry to the maintenance support device 3 is greater than a predetermined value. The control signal S1 is not inputted, for example, where the feed capability of the maintenance support device 3 does not reach the predetermined value due to insufficient power of the battery 38 shown in FIG. 5. In response to the control signal S1 inputted, the power supply switching circuit 58 supplies the externally input electric power Pb also to the control unit 50.

The power supply switching circuit 58 also receives an input of a control signal S2 from the main power supply circuit 27. The control signal S2 is inputted at a time when the main power supply circuit 27 starts supplying the internal electric power Pa. As the control signal S2, it is possible to use a voltage of the internal electric power Pa supplied by the main power supply circuit 27.

In a state where the image forming apparatus 2 is set at a maintenance mode for maintenance, and is fed by the maintenance support device 3, the power supply switching circuit 58 performs the following operation.

To be specific, when the supply of the internal electric power Pa resumes and the control signal S2 is inputted, the power supply switching circuit 58 changes the feed via the communication cable 4 to the feed from the image forming apparatus 2 to the maintenance support device 3. To be more specific, a switch SW2 of normally closed type provided between the DC-DC power supply 29 and the internal supply line 423 is turned OFF, and a switch SW1 normally open type provided between the USB power supply 28 and the internal supply line 423 is turned ON.

Figure 4A:
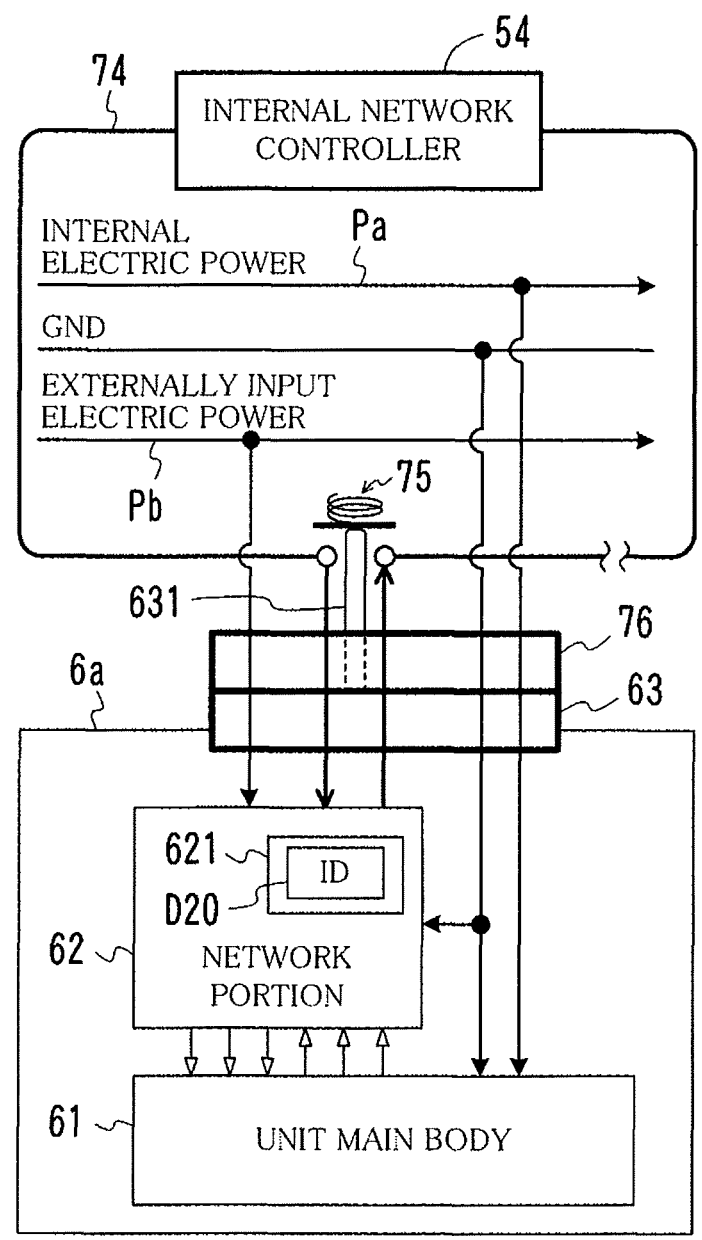

FIGS. 4A and 4B are diagrams showing an example of the configuration of a connection part between the unit 6a of the image forming apparatus 2 and the main body thereof. FIGS. 4A and 4B show the configuration of the unit 6a as an example. The other units 6b through 6j include the connection part which has the same configuration as that of the unit 6a.

The unit 6a includes a connector portion 63 which facilitates replacement of the unit 6a. Referring to FIG. 4A showing the attached state, the connector portion 63 is coupled to a connector portion 76 of the main body of the image forming apparatus 2, so that the main body and the unit 6a are electrically connected with each other.

To be specific, in the attached state, proper internal electric power Pa can be fed to the unit main body 61 and externally input electric power Pb can be fed to the network portion 62. Although not shown in the drawing, proper internal electric power Pa can be fed to the network portion 62.

Coupling of the connector portion 63 and the connector portion 76 causes a pin 631 protruding from the connector portion 63 to push a switch 75 inserted in the signal line 74, resulting in an open state. This allows the signal line 74 to be routed through the network portion 62, which enables communication between the internal network controller 54 and the network portion 62.

The network portion 62 informs a drive control circuit in the unit main body 61 of the command sent from the internal network controller 54, and sends the result of detection by a sensor in the unit main body 61 to the internal network controller 54.

The network portion 62 contains, therein, a non-volatile memory 621 where individual identification information (ID) D20 of the unit 6a is written in advance. The individual identification information D20 is, for example, a product serial number of the unit 6a. The network portion 62 receives a request to send the individual identification information D20 and sends the stored individual identification information D20 to the request source.

In the detached state shown in FIG. 4B, the switch 75 is in a closed state where inter-terminal is short-circuited. Since the signal line 74 and the network portion 62 of the unit 6a are separated from each other, no response is obtained even if the internal network controller 54 asks a response from the unit 6a.

The internal network controller 54 asks a response periodically from the unit 6a. If the unit 6a responds, then the internal network controller 54 determines that the unit 6a is attached. If there is no response, then the internal network controller 54 determines that the unit 6a is detached.

Figure 5:
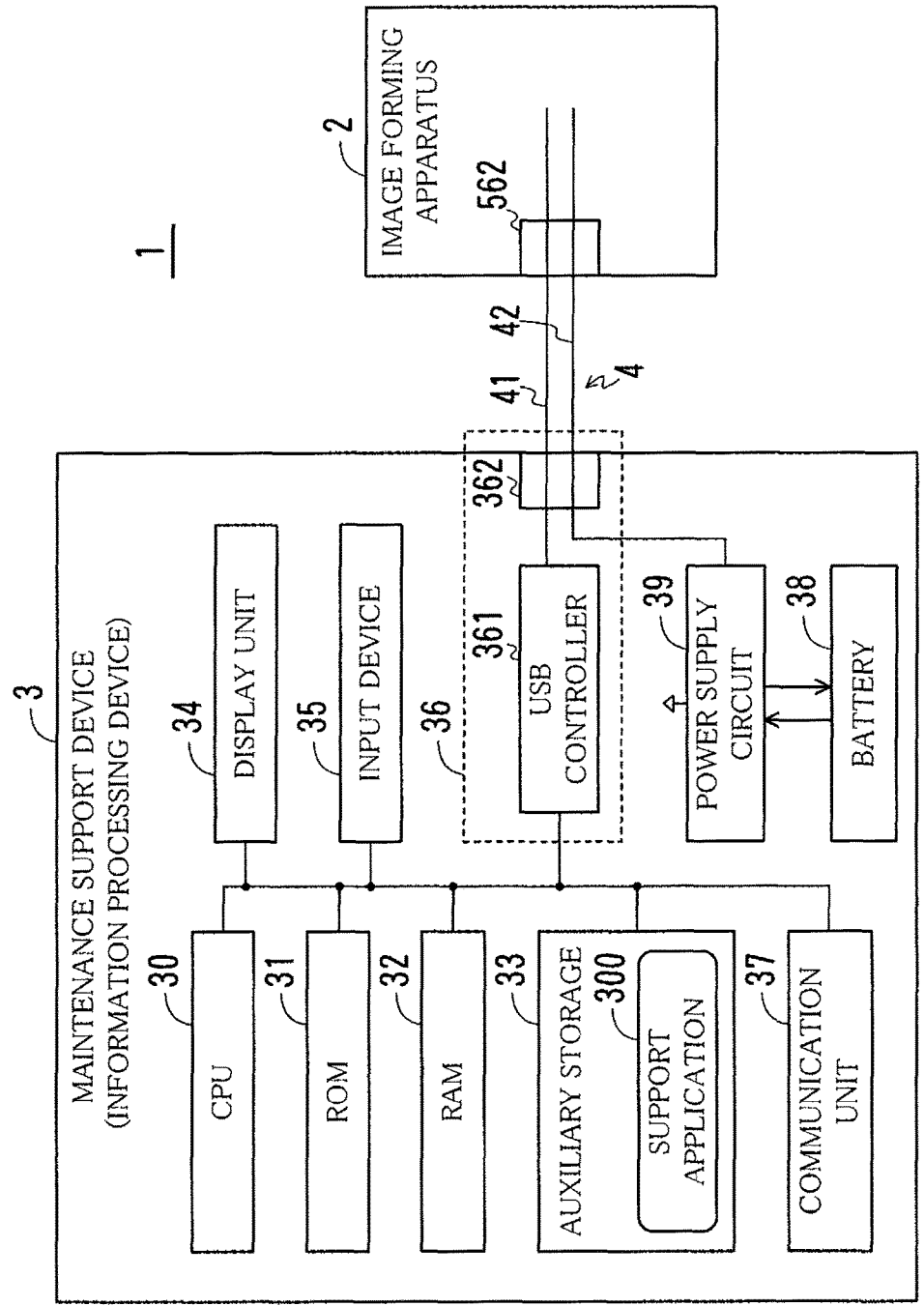
FIG. 5 is a diagram showing an example of the outline of the hardware configuration of a maintenance support device.
Figure 6:
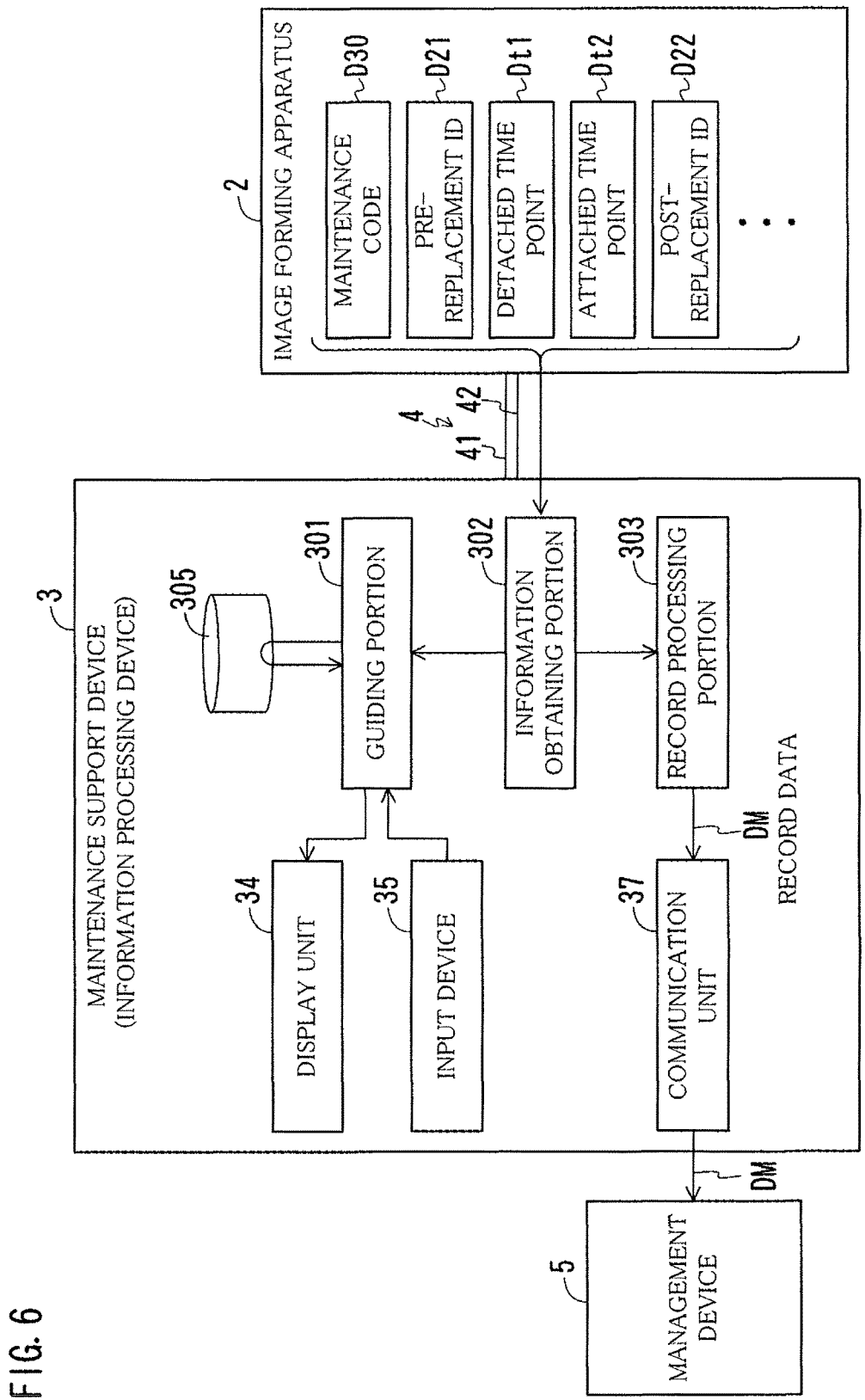
FIG. 6 is a diagram showing an example of the functional configuration of a maintenance support device.

The description goes on to an example of the configuration of the maintenance support device 3 by taking an example in which the maintenance support device 3 is a portable information processing device. FIG. 5 shows an example of the outline of the hardware configuration of the maintenance support device 3. FIG. 6 shows an example of the functional configuration of the maintenance support device 3.

Referring to FIG. 5, the maintenance support device 3 is configured of a CPU 30, a ROM 31, a RAM 32, an auxiliary storage 33, a display unit 34, an input device 35, a USB communication interface 36, a communication unit 37, a battery 38, a power supply circuit 39, and so on.

The ROM 31 stores, therein, Basic Input Output System (BIOS) for managing the display unit 34, the input device 35, and so on.

The auxiliary storage 33 stores, therein, an operating system and a support application program (hereinafter, referred to as the "support application 300"). The support application 300 is a program to support maintenance of the image forming apparatus 2. The support application 300 has a function to obtain information on a component to be replaced in the image forming apparatus 2. The programs, including the support application 300, stored in the auxiliary storage 33 are loaded into the RAM 32 as necessary, and are executed by the CPU 30.

The display unit 34 serves to display a screen for conveying a message to a user, a screen on which a user enters a command, and so on.

The input device 35 is a keyboard, a pointing device, or a combination thereof. The input device 35 conveys to the CPU 30 a signal in accordance with input operation. The pointing device may be a touch pad of the touch panel display.

The USB communication interface 36 is to perform communication with the image forming apparatus 2 via the communication cable 4 and to feed electric power to the image forming apparatus 2. The USB communication interface 36 includes a USB controller 361 and a connector portion 362. The connector portion 362 conforms to the standard of Type-C for USB 3.0 or USB 3.1. The USB controller 361 sends/receives packets with the USB controller 561 of the image forming apparatus 2 via the signal line 41 of the communication cable 4.

The communication unit 37 is to perform mobile phone communication, wireless LAN communication, or wired LAN communication. As described later, the communication unit 37 is used to send record data DM for maintenance work to a management device 5 while the image forming apparatus 2 is subjected to maintenance work.

The battery 38 is a secondary battery used as a power source to operate the maintenance support device 3. The battery 38 feeds electric power accumulated therein to the power supply circuit 39.

The power supply circuit 39 receives an input of electric power from the battery 38, and feeds the electric power to a plurality of supply destinations within the maintenance support device 3. In particular, when the maintenance support device 3 works as a USB host, the power supply circuit 39 feeds, to the USB communication interface 36, electric power which turns into the externally input electric power Pb.

The power supply circuit 39 includes a circuit for charging the battery 38. When the maintenance support device 3 works as a USB device, the power supply circuit 39 charges the battery 38 with DC power supplied from the image forming apparatus 2 via the supply line 42 of the communication cable 4.

When the maintenance support device 3 is used in a state being connected to the commercial power supply 9, the power supply circuit 39 uses electric power supplied from the commercial power supply 9 to feed into the maintenance support device 3, to feed to the image forming apparatus 2, and to charge the battery 38.

Referring to FIG. 6, the maintenance support device 3 is configured of a guiding portion 301, an information obtaining portion 302, a record processing portion 303, and so on. The functions of the individual portions are implemented by executing the support application 300 by the hardware of the control board 20 and the CPU 30.

The guiding portion 301 displays different screens G11 through G22 on the display unit 34 in accordance with operation on the input device 35. The screens G11 through G22 are to offer guidance on maintenance work by a service person. The guiding portion 301 reads, out of the database 305, data on component name which is necessary for display and generates display data on each of the screens G11 through G22. The database 305 is stored in advance in the auxiliary storage 33 as data associated with the support application 300.

In a state where the maintenance support device 3 supplies electric power to the image forming apparatus 2, the information obtaining portion 302 obtains information on maintenance from the image forming apparatus 2 through communication using the USB communication interface 36. To be specific, concerning components to be replaced in the image forming apparatus 2, the information obtaining portion 302 obtains pre-replacement individual identification information D21 and post-replacement individual identification information D22. The information obtaining portion 302 also obtains, for example, a detached time point Dt1, an attached time point Dt2, and a maintenance code D30. The detached time point Dt1 indicates a time at which a component to be replaced is removed from the image forming apparatus 2. The attached time point Dt2 indicates a time at which a new component is attached to the image forming apparatus 2. The maintenance code D30 corresponds to a state of the image forming apparatus 2. In the case where a plurality of components are to be replaced, the information obtaining portion 302 obtains the individual identification information D21, D22, and so on for each of the components to be replaced.

The information obtaining portion 302 informs the guiding portion 301 of the maintenance code D30 obtained, and informs the record processing portion 303 of the individual identification information D21 and D22, the detached time point Dt1, and the attached time point Dt2.

The information obtaining portion 302 also calculates replacement work time DT1 between the detached time point Dt1 and the attached time point Dt2, and informs the guiding portion 301 and the record processing portion 303 of the replacement work time DT1. As a variation thereon, the image forming apparatus 2 may calculate replacement work time DT1 and the information obtaining portion 302 may obtain the replacement work time DT1.

The record processing portion 303 sends the record data DM indicating the pre-replacement individual identification information D21, the post-replacement individual identification information D22, the detached time point Dt1, the attached time point Dt2, the replacement work time DT1, and so on to the management device 5 on the cloud through the communication unit 37.

The invention is not limited to the configuration of direct transmission from the maintenance support device 3 to the management device 5. For example, where the image forming apparatus 2 can perform communication with the management device 5, the record data DM may be temporarily sent to the image forming apparatus 2 through communication with the USB communication interface 36, and then sent through the image forming apparatus 2 to the management device 5. In such a case, the record data DM may be sent to the image forming apparatus 2 through communication using the communication unit 37 and the LAN unit 22 of the image forming apparatus 2 without using the USB communication interface 36.

The description goes on to an example of steps for maintenance work by a service person with reference to FIGS. 7 through 11.

[Maintenance of Printer Section 24]

Figure 7:
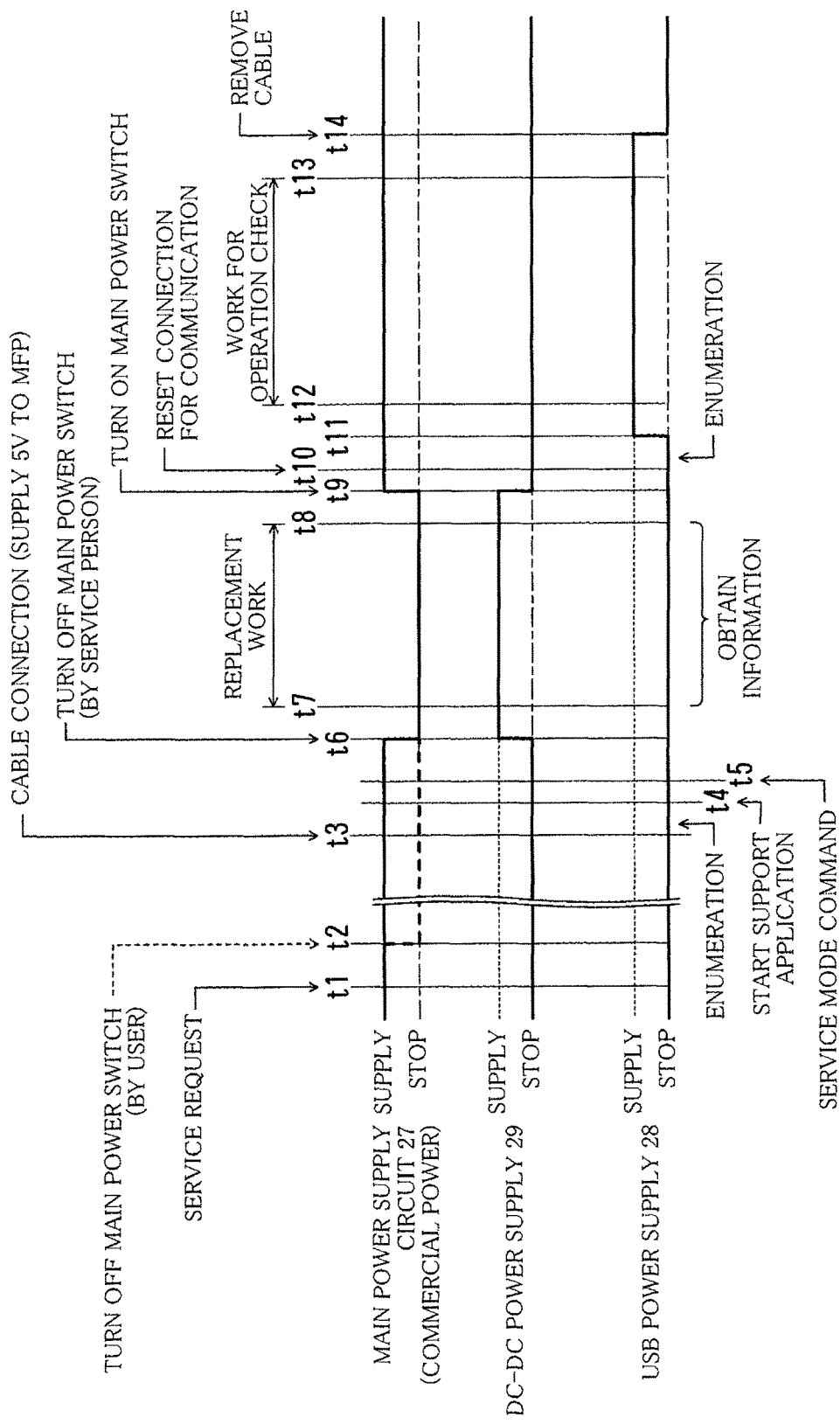
FIG. 7 is a timing chart showing, for the case of unit replacement, the operation of a maintenance support device and an image forming apparatus.
Figure 8:
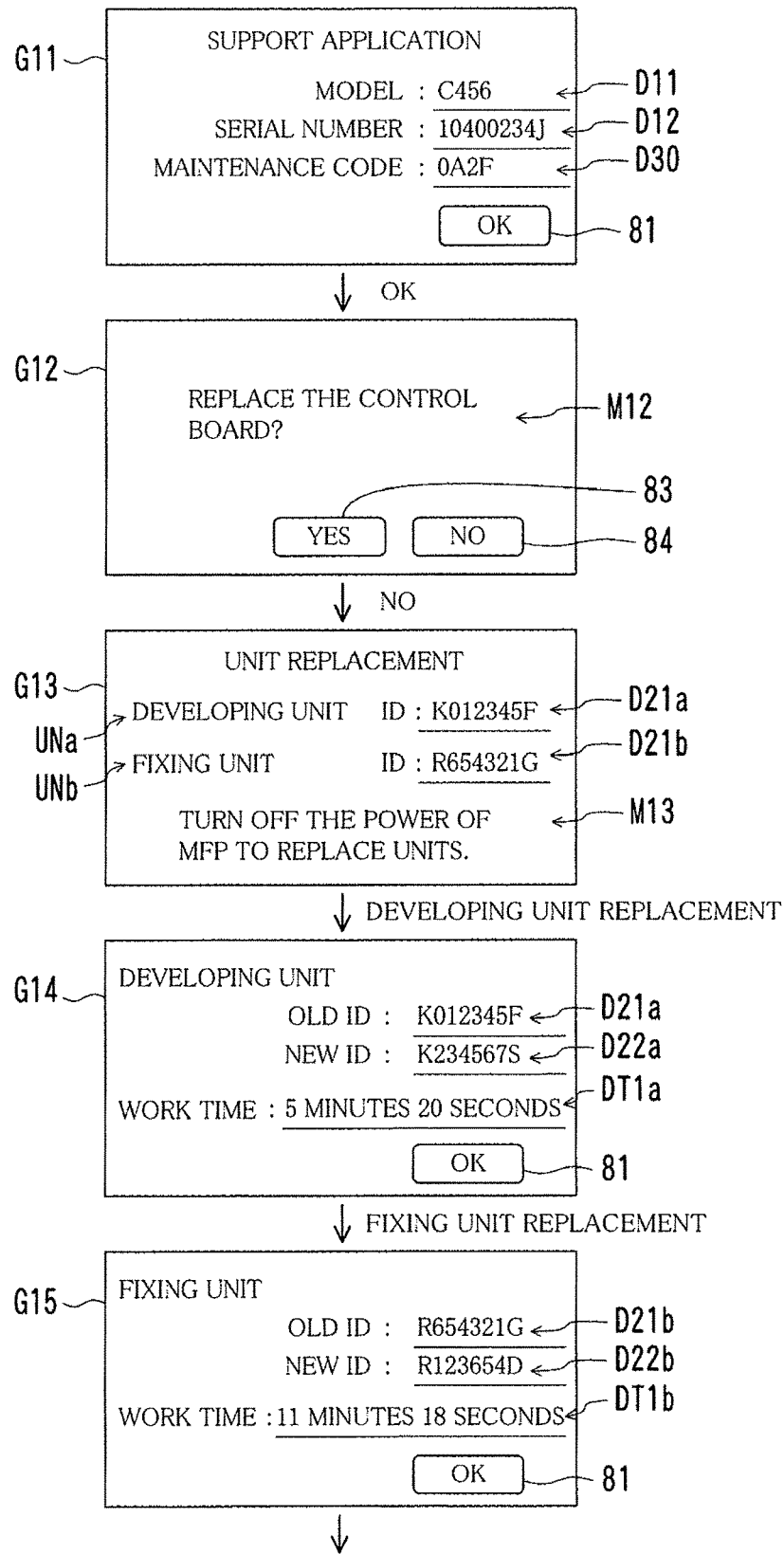
FIG. 8 is a transition diagram of a guide screen for maintenance work.
Figure 9:
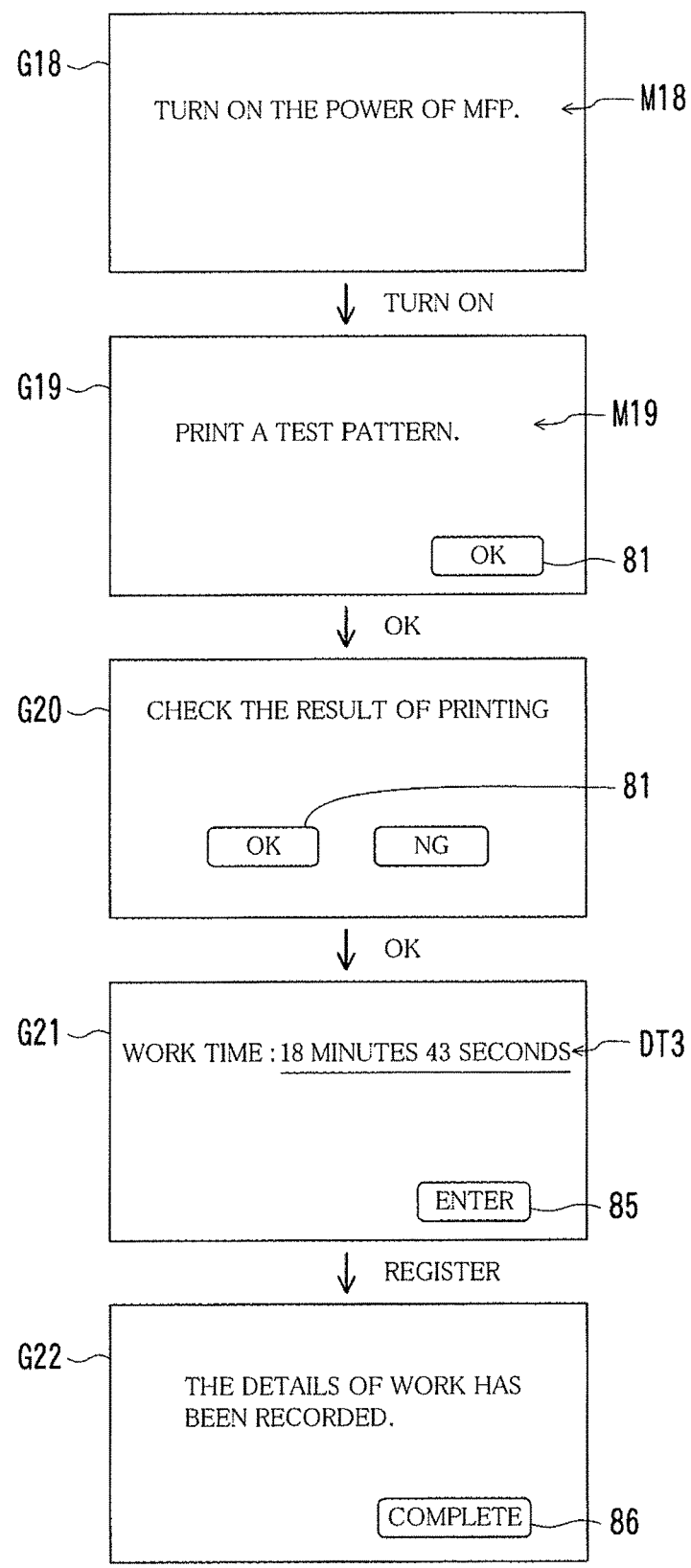
FIG. 9 is a transition diagram of a guide screen for maintenance work.

FIG. 7 is a timing chart showing, for the case of replacement of the units 6a through 6j, the operation of the maintenance support device 3 and the image forming apparatus 2. FIGS. 8 and 9 show an example of the screens G11 through G15 and G18 through G22 for offering guidance on maintenance work.

The service person receives a service request from a user of the image forming apparatus 2 (time point t1 of FIG. 7). The service person carries the maintenance support device 3 to go to an installation site of the image forming apparatus 2. The service person connects the maintenance support device 3 to the image forming apparatus 2 via the communication cable 4 (time point t3). At the time point t3, the image forming apparatus 2 may be supplied with commercial power, or may be supplied with no commercial power because the user turns OFF the power switch at a time point t2.

The maintenance support device 3 connects to the image forming apparatus 2 physically through the communication cable 4. The maintenance support device 3 starts enumeration as a USB host, and obtains information necessary for communication from the image forming apparatus 2 which is a USB device.

The service person starts the support application 300 in the maintenance support device 3 (time point t4).

In response to the support application 300 running, the maintenance support device 3 instructs the image forming apparatus 2 to set a service mode (time point t5), and obtains information associated with maintenance from the image forming apparatus 2. The maintenance support device 3 then displays the screen G11 shown in FIG. 8.

On the screen G11, a model code D11, a serial number D12, the maintenance code D30, and so on of the image forming apparatus 2 are shown. The maintenance code D30 is the number corresponding to a state of the image forming apparatus 2 detected thereby.

The service person confirms the details displayed on the screen G11 to operate an OK button 81. In response to this operation, the maintenance support device 3 displays a screen G12 instead of the screen G11. The screen G12 contains a message M12 to inquire the service person whether or not the control board 20 is to be replaced. The service person operates any one of the buttons 83 and 84 to enter "YES" or "NO". For example, if "NO" is entered, the screen G12 is replaced with a screen G13.

The screen G13 is to show one or more of the units 6a through 6j as a component to be replaced. The maintenance support device 3 displays names UNa and UNb of units to be replaced (units 6a and 6b, for example), pre-replacement individual identification information D21a and D21b for the units 6a and 6b which have been obtained from the image forming apparatus 2, and a message M13 prompting the service person to replace the units 6a and 6b with new units. At this time, the units 6a and 6b to be replaced are identified with reference to a table in which values of the maintenance codes D30 and units to be replaced are correlated with one another.

The service person follows the message M13 on the screen G13 to turn OFF the power switch of the image forming apparatus 2, to remove the power supply cord 262 from the commercial power supply 9, and then starts the replacement work.

Referring back to FIG. 7, when the power switch of the image forming apparatus 2 is turned OFF at a time point t6, the main power supply circuit 27 stops supplying the internal electric power Pa, and the DC-DC power supply 29 supplies the externally input electric power Pb to the control unit 50, and so on. As described earlier, the internal network controller 54 detects the presence/absence of the units 6a and 6b periodically, and when the units 6a and 6b are detached and when the units 6a and 6b are attached, informs the CPU core 511 accordingly. The CPU core 511 sends data indicating the details of that information promptly to the USB controller 561. This allows the maintenance support device 3 to obtain a detached time point Dt1 and an attached time point Dt2 of the units 6a and 6b.

When the service person replaces the unit 6a with a new unit, the maintenance support device 3 displays a screen G14 instead of the screen G13. The screen G14 shows the pre-replacement individual identification information D21a and post-replacement individual identification information D22a for the unit 6a, and a replacement work time DT1a. The service person confirms the detailed information displayed to operate the OK button 81.

When the service person replaces the unit 6b with a new unit after the replacement of the unit 6a, the maintenance support device 3 displays a screen G15 instead of the screen G14. The screen G15 shows the pre-replacement individual identification information D21b and post-replacement individual identification information D22b for the unit 6b, and a replacement work time DT1b.

The two units of the unit 6a and the unit 6b are the target components for the maintenance this time. Thus, when the service person operates the OK button 81 on the screen G15, the maintenance support device 3 directs the service person to the latter half of the maintenance work. In the latter half, operation of the image forming apparatus 2 is checked and a work record (record data DM) is registered into the management device 5.

The maintenance support device 3 displays a screen G18 shown in FIG. 9 instead of the screen G15. The screen G18 contains a message M18 promoting the service person to turn ON the power switch of the image forming apparatus 2. The service person turns ON the power switch. The image forming apparatus 2 starts warming up for image formation and performs processing for feeding electric power to the maintenance support device 3.

To be specific, as shown in FIG. 7, when the main power supply circuit 27 resumes the supply of the internal electric power Pa at a time point t9, the control unit 50 instructs the USB controller 561 to reset the connection for communication with the maintenance support device 3 and to connect again as a USB host to the maintenance support device 3. The USB controller 561 follows the instructions to reset the connection at a time point t10, and performs enumeration. The USB power supply 28 feeds electric power to the maintenance support device 3 after the enumeration, at a time point tn.

After the enumeration is finished, the maintenance support device 3 displays a screen G19. As shown in FIG. 9, the screen G19 contains a message M19 prompting the service person to conduct test printing. The service person uses the operating panel 21 of the image forming apparatus 2 to perform predetermined operation to cause the image forming apparatus 2 to print a test pattern, and then checks the result of printing.

When the service person operates the OK button 81 on the screen G19, the maintenance support device 3 displays a screen G20 for prompting the service person to enter the result of printing, namely, good or no-good. When the service person operates the OK button 81 to input the result indicating good on the screen G20, the screen G20 is replaced with the screen G21.

The screen G21 shows a work time DT3 required for the maintenance this time. For example, the work time DT3 may be a time period between the start of the support application 300 and the current time.

When the service person operates an enter button 85 on the screen G21, the maintenance support device 3 sends the record data DM to the management device 5. The record data DM includes the individual identification information D21a, D22a, D21b, and D22b for the units 6a and 6b replaced, the time DTa and DTb for each replacement work, and the work time DT3.

After sending the record data DM, the maintenance support device 3 displays a screen G22 for informing that the transmission is completed. The service person operates a complete button 86 on the screen G22 to finish the processing by the support application 300. The service person then removes the communication cable 4 from the image forming apparatus 2, and finishes the work.

The image forming apparatus 2 exits the service mode when the support application 300 is finished or when the communication cable 4 is removed from the image forming apparatus 2.

As shown in FIG. 7, the USB power supply 28 feeds electric power to the maintenance support device 3 during a period of time from the time point t11 to a time point t14 at which the communication cable 4 is removed. The period includes a period of time from a time point t12 to a time point t13 during which the service person works for check operation. Stated differently, the electric power of the battery 38 of the maintenance support device 3 is charged because the maintenance support device 3 consumes the electric power for the feed in the former part from the time point t3 to the time point t9.

[Maintenance of Control Board 20]

Figure 10:
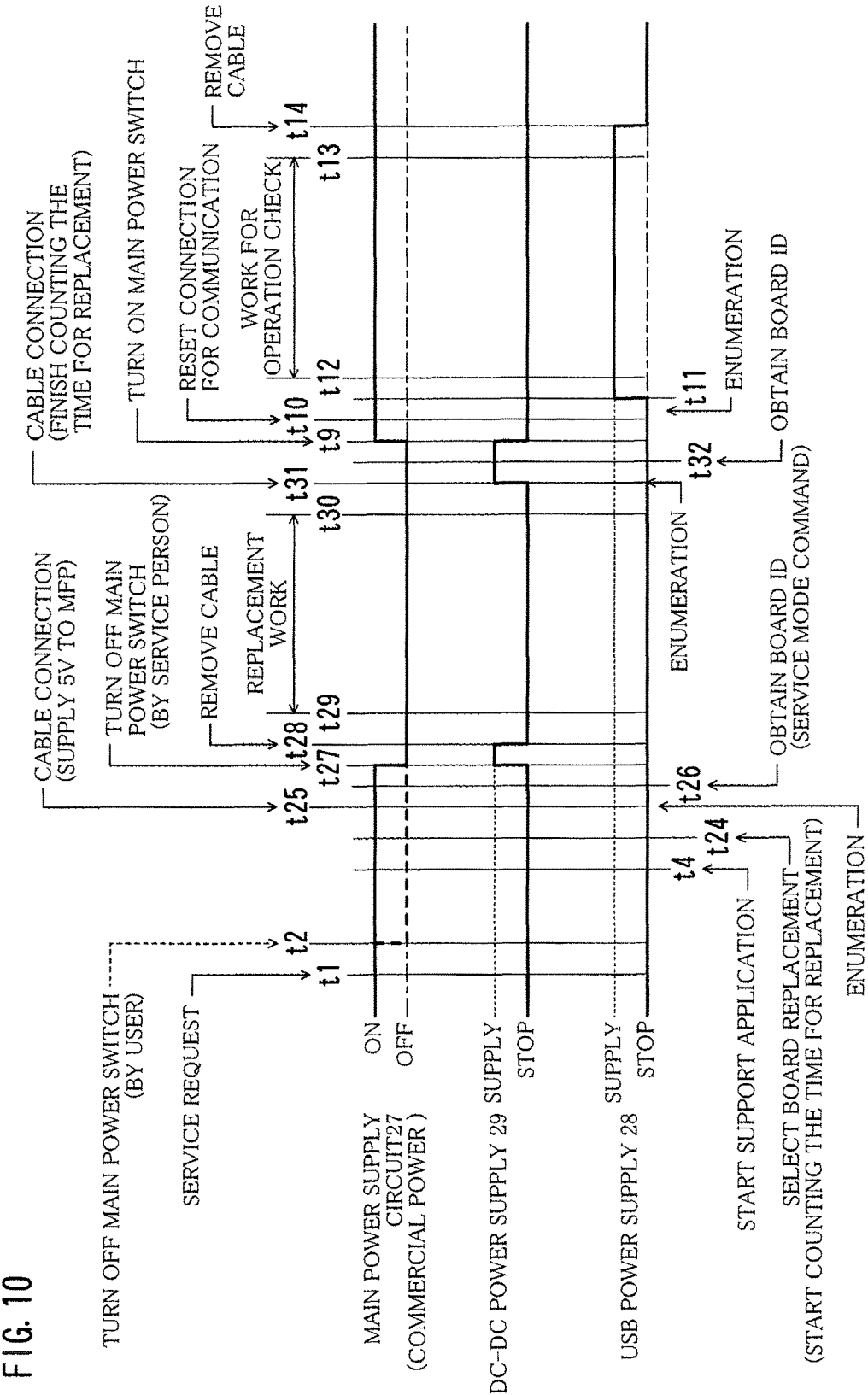
FIG. 10 is a timing chart showing, for the case of control board replacement, the operation of a maintenance support device and an image forming apparatus.

FIG. 10 is a timing chart showing, for the case of replacement of the control board 20, the operation of the maintenance support device 3 and the image forming apparatus 2. FIG. 11 is a transition diagram of the screens G12 and G16 through G18 for guiding maintenance work.

The service person starts the support application 300 (time point t4 of FIG. 10). After that, the service person selects, on the screen G12 for inputting necessity or lack of necessity of replacement of the control board 20, "YES" by operating the button 83. The maintenance support device 3 starts counting the time for replacement from a time point t24.

The service person then connects the maintenance support device 3 through the communication cable 4 to the image forming apparatus 2. Once being connected to the image forming apparatus 2, the maintenance support device 3 starts enumeration as a USB host. At a time point t25, the image forming apparatus 2 may be supplied with commercial power or may be supplied with no commercial power.

When finishing the enumeration, the maintenance support device 3 gives a command to set the service mode, and obtains, from the image forming apparatus 2, individual identification information D21x on the control board 20 which is the target component for the replacement work (time point t26). The maintenance support device 3 then displays the individual identification information D21x on the screen G16 as shown in FIG. 11. The individual identification information D21x is, for example, a MAC address.

The service person follows the message M16 on the screen G16 to turn OFF the power switch of the image forming apparatus 2, removes the power supply cord 262 from the commercial power supply 9, and then starts the replacement work. For replacement, the service person removes the communication cable 4 from the control board 20 (time point t28). This stops the supply of the externally input electric power Pb from the DC-DC power supply 29 of the image forming apparatus 2.

During a period of time from the time point t29 to the time point t30, the old control board 20 is removed and a new control board 20 is mounted.

After mounting the new control board 20, the service person connects the communication cable 4 to the new control board 20 (time point t31). The maintenance support device 3 finishes counting the time for replacement at the time point t31, and performs enumeration again as a USB host.

After the enumeration is finished, the maintenance support device 3 obtains individual identification information D22x for the post-replacement control board 20 to display a screen G17. As shown in FIG. 11, on the screen G17, individual identification information D21x for the pre-replacement control board 20 and the individual identification information D22x for the post-replacement control board 20 are displayed. On the screen G17, version of each piece of the old and new firmware is displayed.

When the service person operates the OK button 81 on the screen G17, the maintenance support device 3 displays the screen G18 instead of the screen G17. After that, the latter half of the maintenance work is directed as with the case of FIG. 9. On the screen G21, replacement time calculated by counting the time from the time point t24 to the time point t31 is displayed as the work time DT3. While the latter half of the maintenance work is performed, electric power is fed from the image forming apparatus 2 to the maintenance support device 3 to charge the battery 38 as with the case of FIG. 7.

According to the foregoing embodiment, it is possible to accurately record the individual identification information D21a, D22a, D21b, D22b, D21x, and D22x for the replaced units 6a and 6b or replaced control board 20, the work time DT1a and DT1b for each replacement work of the units 6a and 6b or control board 20, and the work time DT3 for the entire work. Stated differently, it is possible to record the details of maintenance work with no commercial power supplied, more accurately than is conventionally possible.

This enables analysis of difficulty level of the work, review of steps for the work based on the accurate record.

Further, according to the foregoing embodiment, during the latter half of the work, the battery 38 is charged by using the commercial power supply 9 to feed from the image forming apparatus 2 to the maintenance support device 3. Therefore, it is possible to omit the steps for charging the maintenance support device 3.

In the foregoing embodiment, where the maintenance support device 3 is connected to the commercial power supply 9 for use, the connection is informed to the image forming apparatus 2 during enumeration, which omits feeding from the image forming apparatus 2 to the maintenance support device 3.

In the foregoing embodiment, the target components for replacement work are not limited to the units 6a through 6j of the printer section 24 and the control board 20. The target components for replacement work may be a unit of the reader portion 22 and the operating panel 21, for example, as long as the control unit 50 can detect attachment/detachment of the unit and the individual identification information D21 and D22 thereof.

It is to be understood that the configuration of the maintenance support device 3 and the image forming apparatus 2, the constituent elements thereof, the content, order, and time of the processing, the content of the screens G11 and G12, and the like can be appropriately modified without departing from the spirit of the present invention. The maintenance support device 3 can be applied to maintenance work on a device other than the image forming apparatus 2.

Although the present invention has been described and illustrated in detail, it is clearly understood that the present invention is by way of illustrated and example only and is not to be taken by way of limitation, the scope of the present invention being interpreted by terms of the appended claims.

What is claimed is:

1. A maintenance support device for supporting maintenance of an apparatus, the maintenance support device comprising:
   a hardware processor configured to:
   perform communication with the apparatus through a communication cable; and
   feed electric power to the apparatus;
   obtain from the apparatus, while the apparatus is fed with the electric power, individual identification information for a component in the apparatus that has been replaced, and individual identification information for the component that replaced the component that has been replaced by communication with the apparatus through the communication cable; and
   when the maintenance support device is asked by the apparatus about a capability of the maintenance support device to feed electric power to the apparatus, determine whether the maintenance support device has such capability.

2. The maintenance support device according to claim 1, comprising a record processing portion configured to send record data to an external management device, the record data indicating the pre-replacement individual identification information obtained and the postreplacement individual identification information obtained.

3. The maintenance support device according to claim 2, wherein
   the information obtaining portion further obtains detached time point at which the target component is removed from the apparatus and attached time point at which a new component is attached to the apparatus, and the record processing portion sends to the management device, as the record data, data further indicating replacement work time from the detached time point to the attached time point.

4. The maintenance support device according to claim 1, further comprising a guiding portion configured to offer guidance on maintenance work; wherein
the information obtaining portion further obtains, from the apparatus, a maintenance code corresponding to a state of the apparatus, and
the guiding portion displays a screen showing, as a name of the target component, a name of a component correlated with the maintenance code obtained.

5. A maintenance support method for using an information processing device to support maintenance of an apparatus, wherein each of the information processing device and the apparatus includes a communication interface configured to perform communication with each other through a communication cable including a supply line, the method comprising:
performing, by the information processing device, a step for feeding electric power to the communication interface of the apparatus through the communication cable;
performing, by the information processing device, a step for obtaining from the apparatus, while the communication interface of the apparatus is fed with the electric power, pre-replacement individual identification information and post-replacement individual identification information for a target component for replacement work on the apparatus by communication using the communication cable of the information processing device and recording the pre-replacement individual identification information and the post-replacement individual identification information; and
when the information processing device is asked by the apparatus about a capability of the information processing device to feed electric power to the apparatus, determining whether the information processing device has such capability.

6. The maintenance support method according to claim 5, wherein
the information processing device is a portable device including a battery as a power supply for operation of the information processing device and for feed of the electric power to the apparatus,
the apparatus includes a power supply circuit for converting commercial power to a predetermined type of electric power and to supply the resultant to internal supply destinations of the apparatus,
the information processing device and the apparatus are connected to each other so as to enable switching between feed from the information processing device to the apparatus through the communication cable and feed from the apparatus to the information processing device through the communication cable,
when the power supply circuit, which has stopped supplying the electric power, resumes supply of the electric power while the information processing device and the apparatus operate by the electric power fed from the information processing device, the information processing device and the apparatus switch the feed through the communication cable to the feed from the apparatus to the information processing device, and
the information processing device charges the battery by the electric power fed from the apparatus.

7. A non-transitory recording medium for storing a computer readable program used in a computer, the computer readable program controlling the information processing device to execute the individual steps according to claim 5.

8. The non-transitory recording medium according to claim 7, wherein the computer readable program controls the information processing device to further execute a step for sending record data to an external management device, the record data indicating the pre-replacement individual identification information obtained and the post-replacement individual identification information obtained.

9. An image forming apparatus operated by commercial power, the image forming apparatus comprising:
an image forming portion configured to form an image by using a detachable unit;
a control portion configured to control the image forming portion;
a communication interface configured to communicate with an external device through a communication cable having a supply line; and
a power supply switching circuit configured to supply, when supply of the commercial power stops, electric power supplied from the external device through the supply line to the control portion and the communication interface; wherein
when the supply of the commercial power stops, the control portion operates by the electric power supplied from the external device and follows a command from the external device to convey information to the external device through the communication interface.

10. The image forming apparatus according to claim 9, wherein
the communication interface is configured to switch between feed from the external device through the communication cable and feed to the external device through the communication cable, and
when supplying the commercial power, which has stopped, resumes while the image forming apparatus is placed in a maintenance mode set for maintenance of the image forming apparatus and is fed with electric power from the external device, the power supply switching circuit switches the feed through the communication cable to the feed from the image forming apparatus to the external device.

11. The image forming apparatus according to claim 9, wherein
the power supply switching circuit supplies the electric power to the communication interface prior to supplying the electric power to the control portion,
the communication interface asks the external device about a feed capability thereof, and
where the external device has such a feed capability as to be capable of feeding the control portion, the power supply switching circuit supplies the electric power also to the control portion.

12. The image forming apparatus according to claim 9, wherein the power supply switching circuit supplies the electric power only to a part of the control portion, the part involving in responding to the command.

13. The image forming apparatus according to claim 9, wherein, as the communication cable, a cable conforming to standard of Type-C for USB 3.0 or USB 3.1 is connectable to the communication interface.

14. A non-transitory recording medium for storing a computer readable program used in an image forming apparatus, the image forming apparatus operated by commercial power and including an image forming portion for forming an image by using a detachable unit; a control portion for controlling the image forming portion; a communication interface for communicating with an external device through a communication cable having a supply line; and a power supply switching circuit for supplying, when supply of the commercial power stops, electric power supplied from the external device through the supply line to the control portion and the communication interface, the computer readable program controlling the control portion to execute processing comprising:

processing for conveying, when the supply of the commercial power stops, to the external device through the communication interface, individual identification information on the unit attached by operating by the electric power supplied from the external device and following a command from the external device.

\* \* \* \* \*